United States Patent [19]

Lincoln et al.

[11] 3,714,353
[45] *Jan. 30, 1973

[54] THERAPEUTIC COMPOSITIONS COMPRISING A 6α; 9α-DIFLUORO-11β,17α,21-TRIHYDROXY-16α-METHYL-1,4-PREGNADIENE-3,20-DIONE AND 21-ACYLATES

[75] Inventors: Frank H. Lincoln; William P. Schneider; George B. Spero, all of Kalamazoo, Mich.

[73] Assignee: The Upjohn Company, Kalamazoo, Mich.

[*] Notice: The portion of the term of this patent subsequent to March 3, 1987, has been disclaimed.

[22] Filed: Aug. 11, 1959

[21] Appl. No.: 832,899

Related U.S. Application Data

[63] Continuation-in-part of Ser. No. 753,157, Aug. 4, 1958, Pat. No. 3,499,016.

[52] U.S. Cl. ..........424/243, 260/397.45, 260/397.1, 260/239.55 R, 260/239.5, 195/51

[51] Int. Cl.................C07c 169/32, A61k 15/02
[58] Field of Search...............167/77, 65 N

[56] References Cited

UNITED STATES PATENTS

| | | | |
|---|---|---|---|
| 3,499,016 | 3/1970 | Lincoln et al. | 260/397.45 |
| 2,838,537 | 6/1958 | Spero et al. | 167/77 X |
| 2,838,538 | 6/1958 | Spero et al. | 167/77 X |
| 2,838,499 | 6/1958 | Spero et al. | 167/77 X |

*Primary Examiner*—Elbert L. Roberts
*Attorney*—Eugene O. Retter and Joseph K. Andonian

[57] ABSTRACT

This invention relates to therapeutic compositions and more particularly to therapeutic compositions comprising a 6α,9α-difluoro-11β,17α,21-trihydroxy-16α-methyl-1,4-pregnadiene-3,20-dione and 21-acylates and water-ssoluble salts thereof as an essential active ingredient in combination with a pharmaceutical vehicle.

8 Claims, No Drawings

THERAPEUTIC COMPOSITIONS COMPRISING A 6α; 9α-DIFLUORO-11β,17α,21-TRIHYDROXY-16α-METHYL-1,4-PREGNADIENE-3,20-DIONE AND 21-ACYLATES

This application is a continuation-in-part of application Ser. No. 753,157, filed Aug. 4, 1958, now U.S. Pat. No. 3,499,016.

The novel compositions of the present invention comprise as the principal active ingredient, a compound of the formula:

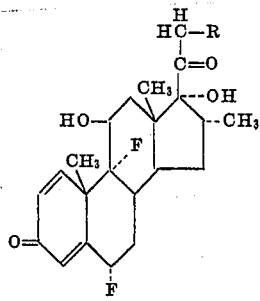

wherein R is hydroxy, acyloxy, in which the acyl radical is that of an organic carboxylic acid containing from one to 12 carbon atoms, inclusive, or water-soluble salts of a pharmacologically acceptable anion and an acid ester of a dicarboxylic acid containing from four to 16 carbon atoms, inclusive, the said principal active ingredients, either singly or in combination, being dispersed in a pharmaceutical carrier.

The compositions of the present invention are useful in the treatment of humans and animals for various pathological conditions. The compositions provide a means for administration of the therapeutic ingredient by the oral and parenteral routes for systemic treatment as well as topical or localized treatment. The invention provides a method for the treatment of conditions such as rheumatoid arthritis, rheumatic fever, various dermatoses, eye and ear inflammations, joint (intra-articular) inflammation and adrenal hyperplasia. The compositions are advantageous for treating said conditions for reason of the improved ratio of therapeutic activity to undesirable side-effects, e.g., gastrointestinal disturbances, salt retention, edema, etc., known to exist with similar known therapeutically active steroids.

The following diagrams and description illustrate the preparation of the therapeutic ingredient of the compositions of the present invention.

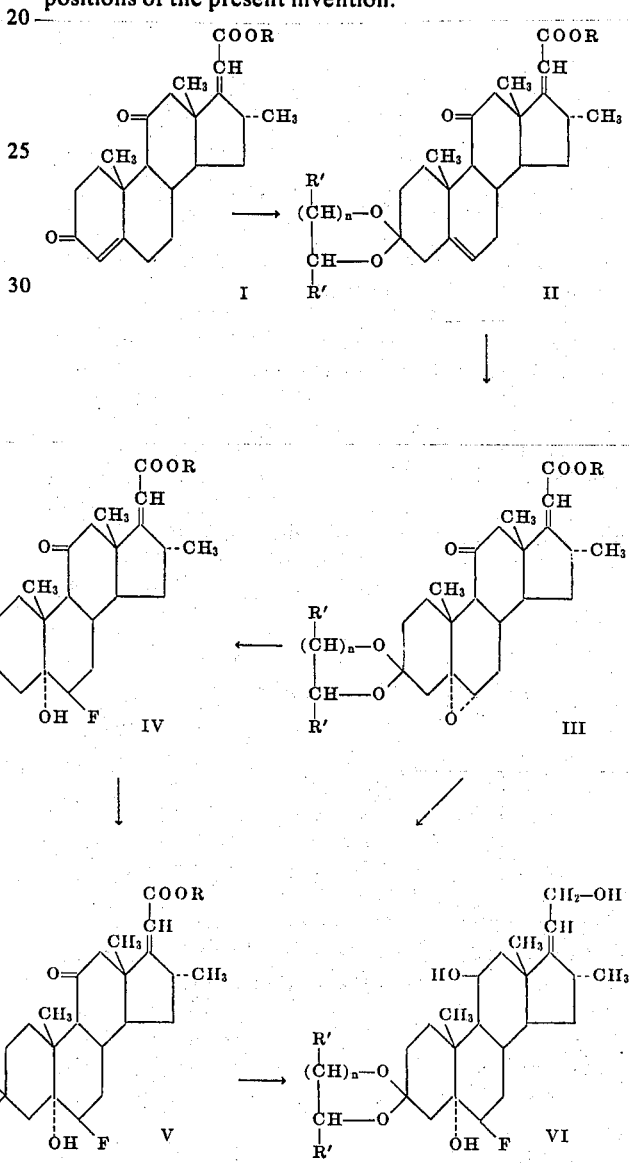

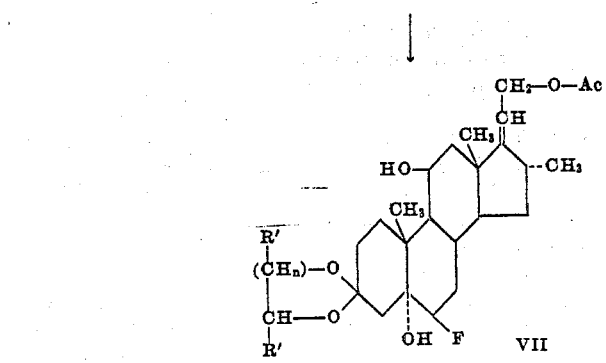

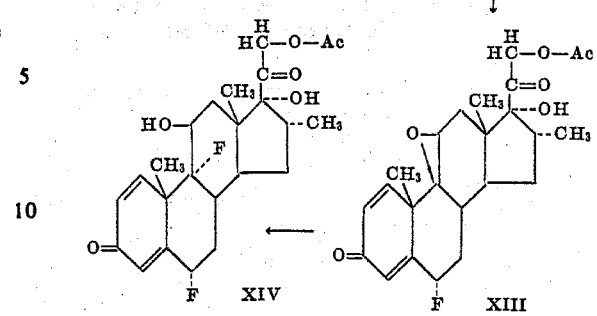

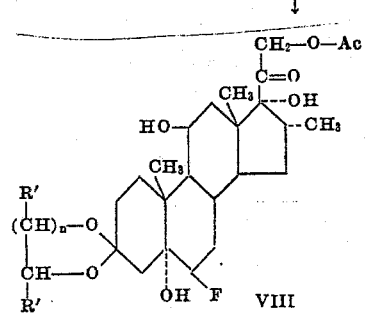

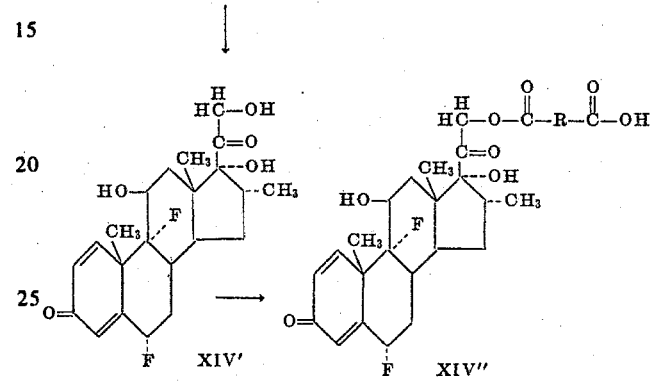

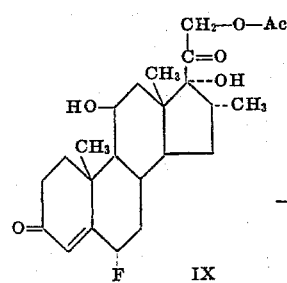

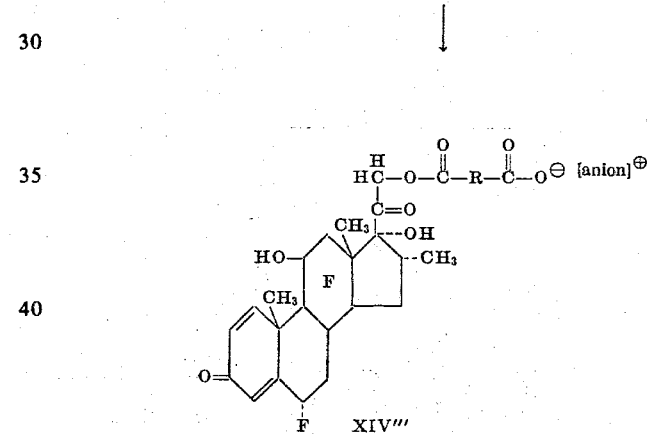

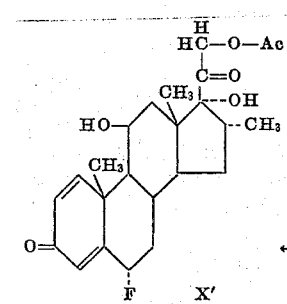

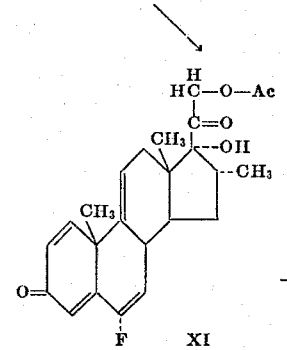

The preceding diagrams XIV, XIV', XIV'', and XIV''' represent the forms of the therapeutic ingredient of the compositions of the present invention. The said forms can be named as derivatives of prednisolone, such as, for example, 6α,9α-difluoro-16α-methylprednisolone, 6α,9α-difluoro-16α-methylprednisolone (21) acetate, 6α,9α-difluoro-16α-methylprednisolone (21) hemisuccinate, and 6α,9α-difluoro-16α-methylprednisolone (21) succinate sodium.

The starting 3,11-diketo-16α-methyl-4,17(20)-pregnadien-21-oic acid methyl ester is prepared from the known 11-keto-16-dehydroprogesterone by the following reactions: The 3-keto group of 11-keto-16-dehydroprogesterone is selectively protected from reaction by conversion to a 3-enamine, e.g., pyrrolidyl enamine, according to procedures well known in the art. The 3-enamine of 11-keto-16-dehydroprogesterone is then reacted with a methyl Grignard reagent, preferably methyl magnesium bromide or iodide, in the presence of a 1,4-addition promoting reagent, e.g., cuprous chloride, [see "Grignard Reactions", Kharasch and Reinmuth, Prentice Hall, Inc. Publishers (1954), page 219, for a discussion of other catalysts], to produce the 3-enamine of 11-keto-16α-methylprogesterone. The 3-enamine group is then hydrolyzed, e.g., with aqueous alkali to produce 11-keto-16α-methylprogesterone.

11-keto-16α-methylprogesterone is then converted to 3,11-diketo-16α-methyl-4,17(20)-pregnadien-21-oic acid lower-alkyl ester (I) in the manner described in U. S. Pat. No. 2,790,814 for the conversion of 11-ketoprogesterone to 3,11-diketo-4,17(20)-pregnadien-21-oic acid methyl ester, i.e., 11-keto-16α-methylprogesterone is reacted with more than two molar equivalents each of an alkyl diester of oxalic acid, preferably methyl or ethyl oxalate, and a base, preferably sodium methoxide or ethoxide or potassium tertiary butoxide, to produce the alkali-metal dienolate of 2,21-dialkoxyoxalyl-11-keto-16α-methylprogesterone. This compound, or the free enol, e.g., prepared by reaction of the alkali-metal dienolate with acetic acid, is then trihalogenated with chlorine or bromine, preferably the latter, to produce 2,21-dialkoxyoxalyl-2,21,21-trihalo-11-keto-16α-methylprogesterone. This compound rearranges with strong base, e.g., an alkali-metal alkoxide, in the presence of an alkanol, e.g., sodium methoxide or ethoxide in methanol or ethanol, to produce 2-halo-3,11-diketo-16α-methyl-4,17(20)-pregnadien-21-oic acid alkyl ester. The 2-halo group is removed by zinc and acetic acid or other halogen removing agent to produce 3,11-diketo-16α-methyl-4,17(20)-pregadien-21-oic acid alkyl ester (I).

The therapeutic ingredient of the present invention is prepared from 3,11-diketo-16α-methyl-4,17(20)-pregnadien-21-oic acid lower-alkyl ester (I) by the following reactions: The 3-keto group is ketalized according to the method of U. S. Pat. No. 2,707,184 or 2,758,993 to produce the 3-ketal of 3,11-diketo-16α-methyl-4,17(20)-pregnadien-21-oic acid lower-alkyl ester (II). Ethylene glycol is the preferred ketalizing agent and the methyl and ethyl esters are preferred.

The next step of the process involves the epoxidation of the 5(6)-double bond of a 3-ketal of 3,11-diketo-16α-methyl-4,17(20)-pregnadien-21-oic acid lower-alkyl ester with a peracid, e.g., peracetic or perbenzoic, or other known epoxidizing agents, to produce the corresponding 5,6-epoxide (III). A mixture of both the α- and β- epoxides is produced in this epoxidation reaction, and the mixture can be separated by chromatographic or crystallization techniques known in the art. The α-epoxide is employed in the next step.

The next step is an epoxide opening step in which a 3-ketalized 3,11-diketo-5α,6α-epoxy-16α-methyl-17(20)-pregnen-21-oic acid lower-alkyl ester (III), is reacted with hydrogen fluoride, to open the oxide ring and produce the corresponding 3-ketalized 3,11-diketo-5α-hydroxy-6β-fluoro-16α-methyl-17(20)-pregnen-21-oic acid lower-alkyl ester (V). This epoxide opening step is ordinarily carried out at temperatures between about −40° and +50° C., the preferred limits being between about 0° and 25° centigrade. It can be performed under anhydrous conditions in the presence or absence of a catalyst, e.g., boron trifluoride, or under aqueous conditions in which case the ketal group is removed by hydrolysis. Reaction conditions, e.g., those disclosed by Schmidlin et al., Helv. Chim. Acta, 36, 1241 (1953); Gallagher, J. Biol. Chem., 162, 495 (1946); Cornforth et al., J. Chem. Soc., 1954, 907 and Fried et al., J. Am. Chem. Soc., 75, 2273 (1953), are usually employed. As anhydrous conditions are often difficult or inconvenient to maintain, the oxide opening reaction is preferably performed under aqueous conditions in which case the ketal group will be hydrolyzed at the same time to produce IV. The thus-produced 3-keto group of IV can then be reketalized in the manner described hereinabove to produce the corresponding ketal (V).

The next step of the process is a reduction step in which a 3-ketalized 3-keto-5α-hydroxy-6β-fluoro-16α-methyl-17(20)-pregnen-21-oic acid lower-alkyl ester (V), preferably the 3-ethylene glycol ketal of 3,11-diketo-5α-hydroxy-6β-fluoro-16α-methyl-17(20)-pregnen-21-oic acid lower-alkyl, preferably methyl or ethyl, ester, is reduced with lithium aluminum hydride or other chemical carboxyl reducing agent in an organic solvent, e.g., ether, dioxane, tetrahydrofuran, benzene, to produce the corresponding 3-ketalized 5α,11β,21-trihydroxy-6β-fluoro-16α-methyl-17(20)-pregnen-3-one. At completion of this reaction, the reaction mixture is preferably mixed with water or, an acid, an ester or carbonyl agent followed by water, to decompose any excess lithium aluminum hydride and organo-metal complexes. The usual reaction conditions for a lithium aluminum hydride reduction are employed, except that a reaction temperature at room temperature or below is preferred, and acid, though operative and satisfactory under carefully controlled conditions, is preferably not employed in the decomposition step, to avoid undue hydrolysis of the ketal group.

The next step is an esterification reaction involving the conversion of the 21-hydroxy group of a 3-ketal of 5α,11β,21-trihydroxy-6β-fluoro-16α-methyl-17(20)-pregnen-3-one (VI) to a 21-acyloxy group so as to protect the 21-hydroxy group in the next step, i.e., the oxidative hydroxylation step. This reaction can be performed under the esterification conditions known in the art, e.g., by the reaction of IV with the selected acid halide, e.g., acid chloride or acid bromide, or the anhydride of a hydrocarbon carboxylic acid, or by reaction with the selected acid, in the presence of an esterification catalyst or with an ester under ester exchange reaction conditions. Reaction conditions which are apt to affect the labile 3-ketal group, the 11β-hydroxy group or the 6-fluoro group should be avoided.

In the next step of the process, the thus-produced ester (VII) is then oxidatively hydroxylated with osmium tetroxide and an oxidizing reagent, e.g., hydrogen peroxide, organic peracid, an amine oxide peroxide, or an aryl iodo oxide, in the manner described in U. S. Patent Nos. 2,769,825, 2,769,823 or in Hogg et al., J. Am. Chem. Soc., 77, 4436 (1955), to produce the corresponding 3-ketal of 5α11β,17α,21-tetrahydroxy-6β-fluoro-16α-methylpregnane-3,20-dione 21-acylate (VIII).

The next step of the process involves the simultaneous removal of the 3-ketal group, the dehydration of the 5α-hydroxy group and the epimerization of the 6β-fluoro group of a 3-ketal of 5α,11β,17α,21-tetrahydroxy-6β-fluoro-16α-methylpregnane-3,20-dione 21-acylate to produce 6α-fluoro-11β,17α,21-trihydroxy-16α-methyl-4-pregnene-3,20-dione 21-acylate. Although these reactions can be performed in sequence, i.e., removal of the 3-ketal under mildly acidic conditions, the dehydration using Girards Reagent T and the epimerization using anhydrous mineral acid, these reactions are preferably performed simultaneously. This can be accomplished under acidic conditions, preferably employing a mineral acid in an inert solvent for the steroid, e.g., chloroform or methylene chloride and preferably in the presence of a lower alkanol, e.g., methanol or ethanol.

The 6α-fluoro-11β,17α,21-trihydroxy-16α-methyl-4-preg-nene-3,20-dione 21-acylate (IX) thus produced can be hydrolyzed to the corresponding free 21-alcohol (IX') in accordance with known methods for hydrolyzing Compound F 21-esters to the free Compound F alcohol. A preferred procedure is to employ at least a molar equivalent of an alkali metal bicarbonate, e.g., potassium bicarbonate in a substantially oxygen free solution of a mixture of lower-alkanol and water. The hydrolysis reaction is carried out at a temperature between 10° and 70° C. while protecting the mixture from atmospheric oxygen. After the hydrolysis is complete, the reaction mixture is neutralized with an acid, e.g., acetic acid, and the hydrolyzed product (IX') recovered from the reaction mixture by evaporation and crystallization, extraction with methylene chloride and the like.

In the next step the 6α-fluoro-11β,17α,21-trihydroxy-16α-methyl-4-pregnene-3,20-dione (IX') or its 21-acylate (IX), preferably the 21-acetate, is dehydrogenated at the 1(2) position to obtain 6α-fluoro-11β,17α,21-trihydroxy-16α-methyl-1,4-pregnadiene-3,20-dione (X). For example, they (IX and IX') can be dehydrogenated at the one position without otherwise degrading the nucleus, e.g., of the genus Septomyxa, to produce 6α-fluoro-11β,17α,21-trihydroxy-16α-methyl-1,4-pregnadiene-3,20-dione (X). This compound (X), in turn, can be esterified to produce its 21-esters (X') by reaction with the appropriate acid anhydride, acid chloride or bromide, or by other methods known in the art.

The 6α,9α-difluoro compounds of the present invention are prepared as follows: dehydrating a 6α-fluoro-11β,17α,21-trihydroxy-16α-methyl-1,4-pregnadiene-3,20-dione 21-acylate (X'), illustratively with sulfuric acid or preferably with an N-haloamide followed by anhydrous sulfur dioxide, to produce 6α-fluoro-16α-methyl-17α,21-dihydroxy-1,4,9(11)-pregnatriene-3,20-dione 21-acylate (XI). Addition of a hypohalous acid, i.e., hypochlorous, hypoiodous, or hypobromous acid, to the compound (XI) produces 6α-fluoro-9α-halo-11β,17α,21-trihydroxy-16α-methyl-1,4-pregnadiene-3,20-dione 21-acylate (XII), which by treatment with a base, e.g., anhydrous potassium acetate, yields the corresponding epoxy compound (XIII); i.e., 6α-fluoro-9β,11β-epoxy-16α-methyl-17α,21-dihydroxy-1,4-pregnadiene-3,20-dione 21-acylate. Treatment of the epoxy compounds with hydrogen fluoride or other hydrogen fluoride releasing agents produces the highly active 6α,9α-difluoro-11β,17α,21-trihydroxy-16α-methyl-1,4-pregnadiene-3,20-dione 21-acylate (XIV). Hydrolysis of the esters (XIV) with a base, e.g., aqueous sodium hydroxide or sodium bicarbonate, provides the free alcohol, e.g., 6α,9α-difluoro-16α-methyl-11β,17α,21-trihydroxy-1,4-pregnadiene-3,20-dione (XIV').

To produce the water soluble derivatives the 6α,9α-difluoro-11β,17α,21-trihydroxy-16α-methyl-1,4-pregnadiene-3,20-dione (XIV') is reacted with an excess of a carboxylic inner anhydride of a dibasic acid, e.g., succinic, glutaric, α-methylglutaric, β-methylglutaric, β,β-dimethylglutaric, adipic, pimelic, suberic, and the like, in a mutual solvent, advantageously, an organic base such as pyridine or lutidine. The reaction normally takes place within a few hours at room temperature. Gentle heating can be used, but is generally undesirable. Also, if the anhydride is sufficiently active or if a longer time is used, temperatures below room temperature is used.

The product hemi-ester (XIV'') can be recovered from the reaction mixture by the usual procedures. Advantageously the product is precipitated by adding a liquid which is capable of precipitating the product as the free acid ester or a salt thereof. An aqueous solution of hydrochloric acid or like strong mineral acid can be used advantageously when pyridine or like organic base is used as the mutual solvent. Ordinarily it will be sufficient to pour the reaction mixture slowly into an excess of dilute aqueous hydrochloric acid and then filter off the precipitated product. The product can be further purified by crystallization from a polar solvent such as acetone. Suitable other solvents include: methyl ethyl ketone, methanol, ethanol, isopropanol, β-ethoxyethanol, ethyl acetate and mixtures of same with Skellysolve B, ether, and water where the resulting solvent system is homogeneous.

The free acid hemi-ester thus produced can be converted to a salt by neutralization with the appropriate base. Advantageously, the free acid hemi-ester can be dissolved in a volatile water-miscible solvent, such as acetone, and the solution neutralized by adding aqueous alkali or alcoholic alkali. Advantageously the pH is adjusted to from about 7.2 to about 7.4. Other volatile water-miscible solvents include: methanol, ethanol, isopropanol and dioxane. The solvent is then removed by vacuum distillation, first the volatile solvent and then the water. Advantageously the water is removed by lyophilization. Before lyophilization the water solution can be filter sterilized if a sterile product is desired. Suitable bases are the alkali and alkaline earth metal hydroxides and carbonates, such as sodium, potassium, ammonium, calcium, and magnesium hydroxides and carbonates and lower molecular weight ammonium bases.

The following preparations are illustrative of the preparation of the therapeutic ingredients of the invention, but are not intended to be limiting.

Preparation 1  11-keto-16α-methylprogesterone

To a hot solution of 4.56 gm. (0.014 mole) of 11-keto-16-dehydroprogesterone in 45 ml. of methanol was added 2.25 ml. of pyrrolidine with swirling. The reaction product, the 3-pyrrolidyl enamine of 11-keto-16-dehydroprogesterone, soon separated as yellowish crystals. After cooling to five degrees, the mixture was filtered, the cake washed with cold methanol and dried under vacuum. There was obtained 4.56 gm. of 3-pyrrolidyl-3,5,16-pregnatriene-11,20-dione melting at 154° to 169° C.

A solution of the thus-obtained enamine in 110 ml. of tetrahydrofuran was added slowly to a stirred suspension of 45 ml. of commercial three molar methyl magnesium bromide, 0.90 gm. of cuprous chloride and 50 ml. of tetrahydrofuran. The mixture was cooled to room temperature and stirred under a nitrogen atmosphere for three hours. The excess Grignard reagent was cautiously destroyed by the dropwise addition of 29 ml. of water. To the mixture, containing 3-pyrrolidyl-16α-methyl-3,5-pregnadiene-11,20-dione, was added 18 ml. of acetic acid and 72 ml. of methanol and the mixture was warmed until a clear dark yellow solution was obtained. 103 ml. of a 10 percent aqueous solution of sodium hydroxide was added, bringing the pH to 8. The mixture was heated under reflux for 45 minutes. 5 ml. of acetic acid and 250 ml. of water were added and the cooled mixture was extracted three times with methylene chloride. The combined extracts were washed with an aqueous sodium bicarbonate solution, water and then dried with sodium sulfate. The dried solution was evaporated and the residue, consisting essentially of 11-keto-16α-methylprogesterone, was dissolved in 400 ml. of methylene chloride and chromatographed through a 200-gram column of magnesium silicate (Florisil). The column was developed with 400-milliliter portions of solvent of the following composition and order: five of hexanes (Skellysolve B) plus three percent acetone, five of hexanes plus five percent acetone, eight of hexanes plus seven percent acetone, five of hexanes plus ten percent acetone, four of hexanes plus 15 percent acetone and finally, one of acetone. Fractions 9 to 25 (counting the methylene chloride fraction) were combined and recrystallized from a mixture of acetone and water to give 2.03 gm. of 11-keto-16α 179° to 182° C. A sample recrystallized from a mixture of ethyl acetate and hexanes melted at 183° to 185° C., had an $[\alpha]_D$ of plus 255° ($CHCl_3$), $\lambda_{max}^{alc.}$ 238 m$\mu$, $a_M$ 15,850 and the analysis below.

Calculated for $C_{22}H_{30}O_3$: C, 77.15; H, 8.83.
Found: C, 76.95; H, 8.98.

Preparation 2  3,11-diketo-16α-methyl-4,17(20)-pregnadien-21-oic acid methyl ester A solution of 2.00 gm. (5.8 millimoles) of 11-keto-16α-methylprogesterone in 30 ml. of dry tertiary butyl alcohol was warmed to 50° C. and stirred under nitrogen. To the solution was added 3.2 ml. of ethyl oxalate and 3.03 gm. of a 25 percent methanolic sodium methoxide solution. A yellow-green precipitate of the sodium dienolate of 2,21-diethoxyoxalyl-11-keto-16α-methylprogesterone appeared almost immediately.

The mixture was stirred for 20 minutes after which a cooled solution of 0.98 gm. of anhydrous sodium acetate and 0.84 ml. of acetic acid in 40 ml. of methanol was added, thus producing the free dienol. The solution was cooled to 0° C. and then treated dropwise with a cold solution of 2.0 gm. of bromine in methanol over a period of 10 minutes. There was thus produced 2,21,21-tribromo-2,21-diethoxyoxalyl-11-keto-16α-methylprogesterone.

The cooling bath was removed and to the solution was added 5.72 gm. of a 25 percent methanolic sodium methoxide solution. The stirring was continued for 2.5 hours. There was thus produced 2-bromo-3,11-diketo-16α-methyl-4,17(20)-pregnadien-21-oic acid methyl ester.

To the resulting solution was then added 5 ml. of acetic acid and 1 gm. of zinc dust and stirring was continued for 30 minutes. The mixture was diluted with water, the solids were removed by filtration, and the filtrate extracted thoroughly with methylene chloride. The extract was dried with sodium sulfate and evaporated. The residue was dissolved in 400 ml. of methylene chloride and poured over a 200-gram column of magnesium silicate (Florisil). The column was developed with 400-milliliter portions of solvent of the following composition and order: four of hexanes (Skellysolve B) plus 5 percent acetone, 10 of hexanes plus 7 percent acetone, ten of hexanes plus 10 percent acetone and finally, one of acetone. Fractions 14 to 23 (counting the methylene chloride fraction) contained starting 11-keto-16α-methyl-4-methylprogesterone. Fractions 7 to 12 contained 3,11-diketo-16α-methyl-4,17(20)-pregnadien-21-oic acid methyl ester which, when crystallized from methanol and water and then from methanol, melted at 177° to 184° C., has a $\lambda_{max}^{alc.}$ 232.5 m$\mu$, $a_M$ 26,200, an $[\alpha]_D$ of plus 137° ($CHCl_3$) and the analysis below.

Calculated for $C_{23}H_{30}O_4$: C, 74.56; H, 8.16.
Found: C, 74.58; H, 8.04.

The yield of product is increased if the initial reaction of 11-keto-16α-methylprogesterone with ethyl oxalate and sodium methoxide is conducted at somewhat higher temperatures and/or with longer reaction times.

Preparation 3 The 3-ethylene glycol ketal of 3,11-diketo-16α-methyl-4,17(20)-pregnadien-21-oic acid methyl ester To a solution of 1.5 gm. of 3,11-diketo-16α-methyl-4,17(20)-pregnadien-21-oic acid methyl ester dissolved in 150 ml. of benzene was added 7.5 ml. of ethylene glycol and 0.150 gm. of para-toluenesulfonic acid and the whole was then heated with stirring at the reflux temperature of the reaction mixture for 5.5 hours. The water formed in the reaction was removed by passing the condensate through a water trap. The colled reaction mixture was washed with 100 ml. of a one percent aqueous sodium bicarbonate solution. The benzene layer was then poured on a column of 150 gm. of magnesium silicate (Florisil). The column was developed with 100-milliliter portions of solvent of the following composition and order: eight portions of methylene chloride plus four percent acetone and three portions of methylene chloride plus eight percent acetone. The methylene chloride plus four percent acetone eluates contained the 3-ethylene glycol ketal of 3,11-diketo-16α-methyl-4,17(20)-pregnadien-21-oic acid methyl ester which was freed of solvent by evaporation.

Reacting 3,11-diketo-16α-methyl-4,17(20)-pregnadien-21-oic acid methyl ester with trimethylene glycol in the presence of para-toluenesulfonic acid is productive of the 3-trimethylene glycol ketal of 3,11-diketo-16α-methyl-4,17(20)-pregnadien-21-oic acid methyl ester.

Similarly, other 3-ketals of this and other esters of 3,11-diketo-16α-methyl-4,17(20)-pregnadien-21-oic acid methyl ester are produced by the reaction of the selected ester of 3,11-diketo-16α-methyl-4,17(20)-pregnadien-21-oic acid, e.g., methyl, ethyl, butyl, or octyl ester, with a glycol as hereinbefore described, e.g., ethylene glycol, propylene glycol, trimethylene glycol, lower-alkyl substituted ethylene glycols or trimethylene glycols, in the presence of an acid catalyst, e.g., paratoluenesulfonic acid, hydrogen chloride, sulfuric acid.

Preparation 4 3-ethylene glycol ketal of 3,11-diketo-5α,6α-epoxy-16α-methyl-17(20)-pregnen-21-oic acid methyl ester To a solution of 5 gm. of the 3-ethylene glycol ketal of 3,11-diketo-16α-methyl-4,17(20)-pregnadien-21-oic acid methyl ester in 100 ml. of chloroform was added a chilled solution of 1.9 gm. of perbenzoic acid dissolved in 31.5 ml. of chloroform. The solution was maintained at about 4° C. for 24 hours, and then at room temperature for 72 hours. The solution was then washed with a 5 percent aqueous solution of sodium bicarbonate and then with water. The chloroform layer was separated, dried and the solvent distilled to give a residue of the 3-ethylene glycol ketal of 3,11-diketo-5α,6α-epoxy-16α-methyl-17(20)-pregnen-21-oic acid methyl ester.

Preparation 5 3,11-diketo-5α-hydroxy-6β-fluoro-16α-methyl-17(20)-pregnen-21-oic acid methyl ester To a solution of 1.73 gm. of 3-ethylene glycol ketal of 3,11-diketo-5α,6α-epoxy-16α-methyl-17(20)-pregnen-21-oic acid methyl ester in 16 ml. of methylene chloride was added 6 ml. of 48 percent hydrofluoric acid. The heterogeneous mixture was stirred for 2 hours, made slightly basic with 300 ml. of 5 percent sodium bicarbonate solution, and extracted with methylene chloride. The extract was washed, dried, and evaporated to dryness to give 1.62 gm. of crude solid. Purification by chromatography over magnesium silicate gave two fractions. The first was eluted with methylene chloride plus 5 percent acetone and the second was eluted with methylene chloride plus 10 and 20 percent acetone. Crystallization of the first fraction from a mixture of acetone and Skellysolve B hexanes gave 3,11-diketo-5α-hydroxy-6β-fluoro-16α-methyl-17(20)-pregnen-21-oic acid methyl ester.

Preparation 6 3-ethylene glycol ketal of 3,11-diketo-5α-hydroxy-6β-fluoro-16α-methyl-17(20)-pregnen-21-oic acid methyl ester A mixture of 1.9 gm. of 6β-fluoro-3,11-diketo-5α-hydroxy-16α-methyl-17(20)-pregnen-21-oate, 59 mg. of para-toluenesulfonic acid monohydrate and 31 ml. of distilled ethylene glycol was added to 800 ml. of benzene. The mixture was stirred and refluxed for 2 hours, with the condensate passing through a water trap to remove the water. Then the mixture was cooled, washed with water and evaporated to dryness to give a crude solid which on recrystallization from a mixture of acetone and hexanes gave the 3-ethylene glycol ketal of 3,11-diketo-5α-hydroxy-6β-fluoro-16α-methyl-17(20)-pregnen-21-oic acid methyl ester.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of 3,11-diketo-5α-hydroxy-6β-fluoro-16α-methyl-17(20)-pregnen-21-oic acid methyl ester.

Preparation 7 The 3-ethylene glycol ketal of 5α,11β,21-trihydroxy-6β-fluoro-16α-methyl-17(20)-pregnen-3-one To a solution of 1.96 gm. of the 3-ethylene glycol ketal of 3,11-diketo-5α-hydroxy-6β-fluoro-16α-methyl-17(20)-pregnen-21-oic acid methyl ester in 850 ml. of anhydrous ether was added 3.7 gm. of lithium aluminum hydride. The mixture was stirred for a period of 1 hour, and 200 ml. of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give the 3-ethylene glycol ketal of 5α,11β,21-trihydroxy-6β-fluoro-16α-methyl-17(20)-pregnen-3-one.

Preparation 8 The 3-ethylene glycol ketal of 5α,11β,21-trihydroxy-6β-fluoro-16α-methyl-17(20)-pregnen-3-one 21-acetate 0.87 gm. of the 3-ethylene ketal of 5α,11β,21-trihydroxy-6β-fluoro-16α-methyl-17(20)-pregnen-3-one was dissolved in 10 ml. of acetic anhydride and 10 ml. of pyridine. The solution was maintained 16 hours at room temperature and then poured into ice water to give the 3-ethylene glycol ketal of 5α,11β,21-trihydroxy-6β-fluoro-16α-methyl-17(20)-pregnen-3-one 21-acetate.

Similarly, other 21-organic carboxylic acid esters of 5α,11β,21-trihydroxy-6β-fluoro-16α-methyl-17(20)-pregnen-3-one 3-ethylene ketals can be prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting the 3-ethylene ketal of 5α,11β,21-trihydroxy-6β-fluoro-16α-methyl-17(20)-pregnen-3-one with the appropriate acylating agent, e.g., the anhydride or acid halide of the selected acid in a solvent such as benzene, toluene, acetic acid, or the like, preferably in the presence of pyridine or a similar amine.

Preparation 9 The 3-ethylene glycol ketal of 5α,11β,17α,21-tetrahydroxy-6β-fluoro-16α-methylpregnane-3,20-dione 21-acetate To a solution of 0.93 gm. of the 3-ethylene glycol ketal of 5α,11β-dihydroxy-6β-fluoro-16α-methyl-17(20)-pregnen-3-one 21-acetate in 35 ml. of tertiary butyl alcohol was added 1 ml. of pyridine, 2.75 ml. of two molar N-methylmorpholine oxide peroxide (U. S. 2,769,823) in tertiary butyl alcohol, and 13.1 mg. of osmium tetroxide in tertiary butyl alcohol (9.1 ml. of tertiary butyl alcohol solution containing 1.44 mg. osmium tetroxide per milliliter). The solution was stirred for a period of 18 hours and 15 ml. of 5 percent sodium hydrosulfite was added. Stirring was continued for an additional 10 minutes, at which time 0.7 gm. of finely ground synthetic magnesium silicate was mixed into the solution for a period of 20 minutes and then removed by filtration. The filtrate was evaporated to dryness under reduced pressure at a temperature of less than 50° C. The residue was dissolved in methylene chloride, washed with water, dried and evaporated to dryness. The residue was crystallized from acetone-Skellysolve B hexanes to give the 3-ethylene glycol ketal of 5α,11β,17α,21-tetrahydroxy-6β-fluoro-16α-methylpregnane-3,20-dione 21-acetate.

Preparation 10 6α-fluoro-11β,17α,21-trihydroxy-16α-methyl-4-pregnene-3,20-dione 21-acetate A solution of 0.144 gm. of the 3-ethylene glycol ketal of 5α,11β,17α,21-tetrahydroxy-6β-fluoro-16α-methylpregnane-3,20-dione 21-acetate in 12 ml. of chloroform and 0.1 ml. of absolute alcohol was cooled to minus 10° C. in a ice-salt bath and a stream of anhydrous hydrochloric acid was gently bubbled through the solution for 2.5 hours while the temperature was maintained between minus 5 and minus 15° C. The solution was then diluted with 25 ml. of chloroform, washed with dilute sodium bicarbonate and water, dried over anhydrous sodium sulfate, and evaporated to dryness under reduced pressure at 60° C. or less to give 6α-fluoro-11β,17α,21-trihydroxy-16α-methyl-4-pregnene-3,20-dione 21-acetate.

Preparation 11 6α-fluoro-11β,17α,21-trihydroxy-16α-methyl-4-pregnene-3,20-dione

A solution of 1.1 gm. of 6α-fluoro-11β,17α,21-trihydroxy-16α-methyl-4-pregnene-3,20-dione 21-acetate, 1 gm. of potassium bicarbonate, 100 ml. of methanol and 15 ml. of water were mixed together and purged with nitrogen to remove dissolved oxygen while stirring at 25° C. for 4 hours. The solution was then neutralized by addition of acetic acid and distilled under vacuum to remove the methanol. The residue was extracted with 100 ml. of methylene chloride, and the extract was dried over sodium sulfate to give a solution of 6α-fluoro-11β,17α,21-trihydroxy-16α-methyl-4-pregnene-3,20-dione which was freed of solvent by evaporation.

Preparation 12 6α-fluoro-11β,17α,21-trihydroxy-16α-methyl-1,4-pregnadiene-3,20dione A medium consisting of 1 percent dextrose hydrate, 2 percent cornsteep liquor of 60 percent solids and tap water was adjusted to pH 4.9 with sodium hydroxide. The medium was steam sterilized at 15 pounds pressure for 30 minutes, cooled, and then inoculated with a 24-hour growth, from spores, of Septomyxa affinis A.T.C.C. 6737. The medium was agitated and sparged with sterile air at the rate of one-tenth volume of air per volume of medium per minute. At the end of 24 hours of fermentation at room temperature, the pH was about 7.4. To this culture there was added a solution of 6α-fluoro-11β,17α,21-trihydroxy-16α-methyl-4-pregnene-3,20-dione 21-acetate dissolved in a minimal amount of diethylformamide. The solution was prepared by dissolving 5 parts of the steroid in 100 parts of the solvent and adding about 10 cc. of the solution per liter of the medium. Fermentation was continued for a period of 48 hours whereupon the mycelium and beer were extracted thoroughly with methylene chloride. The extract was washed with sodium bicarbonate solution and then with water, dried and concentrated in vacuo to give 6α-fluoro-11β,17α,21-trihydroxy-16α-methyl-1,4-pregnadiene-3,20-dione.

Following the procedure of Preparation 12, but substituting as starting material 6α-fluoro-11β,17α,21-trihydroxy-16α-methyl-4-pregnene-3,20-dione there was likewise produced 6α-fluoro-11β,7α,21-trihydroxy-16α-methyl-1,4-pregnadiene-3,20-dione.

Preparation 13 6α-fluoro-11β,17α,21-trihydroxy-16α-methyl-1,4-pregnadiene-3,20-dione 21-acetate 1.5 gm. of 6α-fluoro-11α, 17α, 21-trihydroxy-16α-methyl-1,4-pregnadiene-3,20-dione was dissolved in 20 ml. of pyridine and 15 ml. of acetic anhydride and the mixture heated at 40° C. for 4 hours. The solution was cooled and then slowly diluted with water. The precipitated steroid was removed by filtration, washed with water and dried to give 6α-fluoro-11β, 17α, 21-trihydroxy-16α-methyl-1,4-pregnadiene-3,20-dione 21-acetate.

Preparation 14 6α-fluoro-16α-methyl-17α,21-dihydroxy-1,4,9(11)-pregnatriene-3,20-dione 21-acetate To a solution of 8.5 gm. of 6α-fluoro-11β,17α,21-trihydroxy-16α-methyl-1,4-pregnadiene-3,20-dione 21-acetate in 42.5 ml. of pyridine was added 5.63 gm. of N-bromoacetamide. After standing at room temperature for a period of 15 minutes, the reaction solution was cooled to 5° to 10° C. and sulfur dioxide gas was passed over the surface of the solution while shaking the flask until the solution gave no color with acidified starch-iodide paper. During the addition of the sulfur dioxide, the reaction mixture became warm. The temperature was kept under 30° C. by external cooling and by varying the rate of sulfur dioxide addition. Thereafter to the reaction mixture was added 400 ml. of ice water and the resulting precipitate collected by filtration. This material was recrystallized from acetone-Skellysolve B hexanes to give 6α-fluoro-16α-methyl- 17α,21-dihydroxy-1,4,9(11)-pregnatriene-3,20-dione 21-acetate.

Preparation 15 6α-fluoro-9α-bromo-11β,17α,21-trihydroxy-16α-methyl-1,4-pregnadiene-3,20-dione 21-acetate To a solution of 5.68 gm. of 6α-fluoro-16α-methyl-17α,21-dihydroxy-1,4,9(11)-pregnatriene-3,20-dione 21-acetate in 100 ml. of methylene chloride and 250 ml. of tertiary butyl alcohol was added a solution of 14 ml. of 72 percent perchloric acid in 100 ml. of water followed by a solution of 2.34 gm. of N-bromoacetamide in 60 ml. of tertiary butyl alcohol. After stirring the reaction mixture for 15 minutes, a solution of 2.8 gm. of sodium sulfite in 140 ml. of water was added and the reaction mixture was concentrated to a volume of about 500 ml. under reduced pressure at about 50° C. The concentrate was cooled in an ice bath and while stirring 500 ml. of water was added. After stirring for a period of 1 hour, the precipitated product was isolated by filtration, and the cake washed with water and air-dried to give 6α-fluoro-9α-bromo-11β,17α ,21-trihydroxy-16α-methyl-1,4-pregnadiene-3,20-dione 21-acetate.

Substituting N-chlorosuccinimide for the N-bromoacetamide in the reactions described in Preparation 15 is productive of the corresponding 9α-chloro compounds, e.g., 6α-fluoro-9α-chloro-11β,17α,21-trihydroxy-16α-methyl-1,4-pregnadiene-3,20-dione 21-acetate.

Preparation 16 6α-fluoro-9β,11β-epoxy-16α,21-dihydroxy-16α-methyl-1,4-pregnadiene-3,20-dione 21-acetate To a solution of 6.78 gm. of 6α-fluoro-9α-bromo-11β,17α,1-trihydroxy-16α-methyl-1,4-pregnadiene-3,20-dione 21-acetate in 175 ml. of acetone was added 6.78 gm. of potassium acetate and the resulting suspension was heated under reflux for a period of 17 hours.

The mixture was then concentrated to approximately 60 ml. volume at reduced pressure on the steam bath, diluted with water and extracted with methylene chloride. The methylene chloride extracts were combined, washed with water, dried over anhydrous sodium sulfate and evaporated. The residue was redissolved in methylene chloride and chromatographed over 500 gm. of Florisil anhydrous magnesium silicate. The column was eluted with 1-liter portions of hexanes (Skellysolve B) containing increasing proportions of acetone. There was thus eluted 6α-fluoro-9β,11β-epoxy-16α-methyl-17α,21-dihydroxy-1,4-pregnadiene-3,20-dione 21-acetate which was freed of solvent by evaporation of the eluates.

Preparation 17 6α,9α-difluoro-11β,17α,21-trihydroxy-16α-methyl-1,4-pregnadiene-3,20-dione 21-acetate To approximately 1.3 gm. of hydrogen fluoride contained in a polyethylene bottle and maintained at minus 60° C. was added 2.3 ml. of tetrahydrofuran and then a solution of 500 mg. (0.0012 mole) of 6α-fluoro-9β,11β-epoxy-16α-methyl-17α,21-dihydroxy-1,4-pregnadiene-3,20-dione 21-acetate in 2 ml. of methylene chloride. The steroid solution was rinsed in with an addition 1 ml. of methylene chloride. The light red colored solution was then kept at approximately minus 30° C. for 1 hour and at minus 10° C. for two hours. At the end of this period it was mixed cautiously with an excess of cold sodium bicarbonate solution and the organic material extracted with the aid of additional methylene chloride. The combined extracts were washed with water, dried over anhydrous sodium sulfate and concentrated to approximately 35 ml. The solution was chromatographed over 130 gm. of Florisil anhydrous magnesium silicate. The column was developed with 260-milliliter portions of hexanes (Skellysolve B) containing increasing proportions of acetone. There was thus eluted 6α,9α-difluoro-11β,17α,21-trihydroxy-16α-methyl-1,4-pregnadiene-3,10-dione 21-acetate which was freed of solvent by evaporation of the eluate fractions. The compound has a melting point of 258° to 261° C., $\lambda_{max.}^{alc.}$ 238 mμ (ε 16,500), $[\alpha]_D$ plus 61° (acetone), and the analysis below.

Calculated for $C_{24}H_{30}O_6F_2$: C, 63.70; H, 6.68; F, 8.40.
Found: C, 63.32; H, 6.97; F, 8.26.

Preparation 18 6α,9α-difluoro-11β,17α,21-trihydroxy-16α-methyl-1,4-pregnadiene-3,20-dione 3.25 grams of 6α,9α-difluoro-11β,17α,21-trihydroxy-16α-methyl-1,4-pregnadiene-3,20-dione 21-acetate was dissolved in 325 ml. of methanol, previously purged of air-oxygen by passing nitrogen through it for 10 minutes and thereto was added a solution of 1.63 gm. of potassium bicarbonate in 30 ml. of water, similarly purged of oxygen. The mixture was allowed to stand at room temperature for a period of 5 hours in a nitrogen atmosphere, thereupon neutralized with 2.14 ml. of acetic acid in 40 ml. of water. The mixture was concentrated to approximately one-third volume at reduced pressure on a 60° C. water-bath. Thereupon 250 ml. of water was added and the mixture chilled. The crystalline product was collected on a filter, washed with water and dried to give 6α,9α-difluoro-11β,17α,21-trihydroxy-16α-methyl-1,4-pregnadiene-3,20-dione. The compound has a melting point of 234° to 236° C., $\lambda_{max.}^{alc.}$ 238 mμ (ε 15,850) and the analysis below.

Calculated for $C_{22}H_{28}O_5F_2$: F, 9.26.
Found: F, 9.66.

Preparation 19 6α,9α-difluoro-11β,17α,21-trihydroxy-16α-methyl-1,4-pregnadiene-3,20-dione 21-propionate A solution was prepared containing 50 mg. of 6α,9α-difluoro-11β,17α,21-trihydroxy-16α-methyl-1,4-pregnadiene-3,20-dione in 1 ml. of pyridine and 1 ml. of propionic anhydride. The solution was allowed to stand at room temperature for a period of 21 hours and was thereupon poured into 10 ml. of water. The reaction mixture was then extracted with three 10-milliliter portions of methylene chloride, the methylene chloride extracts were combined, washed with water, dried over anhydrous sodium sulfate and evaporated to give a residue of 6α,9α-difluoro-11β,17α,21-trihydroxy-16α-methyl-1,4-pregnadiene-3,20-dione 21-propionate.

6α,9α-difluoro-11β,17α,21-trihydroxy-16α-methyl-1,4-pregnadiene-3,20-dione is converted to other 21-esters by reaction with the appropriate acid anhydride, acid chloride, or bromide or by other methods known in the art, e.g., by ester exchange, acid in the presence of an esterification catalyst, etc., to produce 6α,9α-difluoro-11β,17α,21-trihydroxy-16α-methyl-1,4-pregnadiene-3,20-dione 21-acylates which include those wherein the acyl radical of the 21-acylate group is the acyl radical of, for example, a lower aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3, or 4-methylbenzoic,2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, a dibasic acid, (which can be converted to water soluble, e.g., sodium, salts), e.g., succinic, glutaric, α-methylglutaric, β-methylglutaric, β,β-dimethylglutaric, adipic, pimelic, suberic, a hydroxyacid, e.g., glycolic, lactic, citric, tartaric, d-maleic, d-glyceric, mannonic, gluconic, salicylic, 2,3,4-trimethoxybenzoic, α-napthoxyacetic, or other acyl acid.

Preparation 20 6α,9α-difluoro-11β,17α,21-trihydroxy-16α-methyl-1,4-pregnadiene-3,20-dione 21-hemisuccinate A solution is prepared by stirring gm. of succinic anhydride in 250 ml. of pyridine. With continued stirring 25 gm. of 6α,9α-difluoro-11β,17α,21-trihydroxy-16α-methyl-1,4-pregnadiene-3,20-dione (powdered) is added gradually over a period of 2 to 3 minutes. The stirring is continued until the steroid is dissolved and reaction mixture allowed to stand at room temperature for 20 hours. The reaction mixture is then gradually (over a period of 5 minutes) poured, with stirring, into a cold hydrochloric acid solution prepared by vigorously stirring 300 ml. of concentrated hydrochloric acid into 1,250 gm. of ice in 1 l. of water. The stirring is then continued for 30 minutes. The reaction mixture is then filtered and the cake washed with water (about 500 ml.) until the filtrate has a pH of 4 or higher and dried under vacuum at 50° to 60° C. Following the above procedure 6α,9α-difluoro-11β,17α,21-trihydroxy-16α-methyl-1,4-pregnadiene-3,20-dione 21-hemisuccinate is obtained.

The above product is purified by dissolving it in 125 ml. of acetone at 50° C. The solution is treated with 2.5 gm. of decolorizing carbon, filtered, and the cake washed with 25 ml. of acetone. The filtrate and washings are reheated to 50° C. and diluted with 120 ml. of water, seeded with 6α,9α-difluoro-11β,17α,21-trihydroxy-16α-methyl-1,4-pregnadiene-3,20-dione 21-hemisuccinate, stirred for 30 minutes, and allowed to crystallize at room temperature for 16 hours. The crystals are filtered off, washed (1) with 15 ml. of acetone and (2) with 20 ml. of water; and dried under vacuum at 50° to 60° C.

Preparation 21 Sodium 6α,9α-difluoro-11β,17α,21-trihydroxy-16α-methyl-1,4-pregnadiene-3,20-dione 21-hemisuccinate A solution is prepared by warming 400 gm. of 6α,9α-difluoro-11β,17α,21-trihydroxy-16α-methyl-1,4-pregnadiene- 3,20-dione 21-hemisuccinate in 1.5 l. acetone and cooling to room temperature. With stirring, 1,600 ml. of 0.5 normal aqueous sodium hydroxide is gradually added over a period of 10 minutes. The pH is not allowed to rise above over pH 7.5. The end point adjustment is made by adding 10-milliliter portions of 0.5 N aqueous sodium hydroxide until a 10-milliliter test portion, when diluted with 10 ml. of water, had a pH of 7.2 to 7.4. About 80 ml. is required. The reaction mixture is then concentrated to about 2 l. in an atmosphere of nitrogen and under vacuum. The pot temperature should not exceed about 26° C. The concentrate is treated with 15 gm. of diatomaceous earth, filter sterilized and lyophilized. Following this procedure the sodium salt of 6α,9α-difluoro-11β,17α,21-trihydroxy-16α-methyl-1,4-pregnadiene-3,20-dione 21-hemisuccinate is obtained.

The compositions of the present invention are preferably presented for administration in unit dosage forms such as tablets, capsules, powders, granules, sterile parenteral solutions or suspensions, oral solutions or suspensions, topical ointments, creams, lotions and the like.

For oral administration either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, starch, lactose, acacia, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixture of polymeric acids with such materials as shellac, cetyl alcohol, cellulose acetate and the like. Alternatively, the two component system can be utilized for preparing tablets containing two or more incompatible active ingredients. Capsules, like tablets, are prepared by mixing the steriod with an inert pharmaceutical diluent and filling the mixture into a hard gelatin capsule of appropriate size. Soft gelatin capsules are prepared by machine encapsulation of a slurry of the steriod with light liquid petrolatum or other inert oil.

Fluid unit dosage forms for oral administration such as syrups, elixirs, and suspensions can be prepared. The water-soluble forms can be dissolved in an aqueous vehicle together with sugar, flavoring agents and preservatives to form a syrup. An elixir is prepared using a hydroalcoholic (ethanol) vehicle with suitable sweeteners such as sugar, saccharin, and cyclamate together with a flavoring agent. Suspensions can be prepared of the insoluble forms with a syrup vehicle with the aid of a suspending agent such as acacia, tragacanth, methylcellulose and the like.

Topical ointments can be prepared by dispersing the steriod in a suitable ointment base such as petrolatum, lanolin, polyethylene glycols, mixtures thereof, and the like. Advantageously the steroid is finely divided by means of a colloid mill utilizing light liquid petrolatum as a levigating agent, creams and lotions are similarly prepared by dispersing the steroid in the oil phase of the system.

For parenteral administration, fluid unit dosage forms are prepared utilizing the steroid and a sterile vehicle, water being preferred. The steroid, depending on the form and concentration used, can be either suspended or dissolved in the vehicle. In preparing solutions the water-soluble steroid can be dissolved in water for injection and filter sterilized before filling into a suitable vial or ampule and sealing. Advantageously adjuvants such as a local anesthetic, preservative and buffering agents can be dissolved in the vehicle. To enhance the stability, the composition can be frozen after filling into the vial and the water removed under vacuum; the dry lyophilized powder is then sealed in the vial and an accompanying vial of water for injection is supplied to reconstitute the powder prior to use. Parenteral suspensions are prepared in substantially the same manner except that the steroid is suspended in the vehicle instead of being dissolved and sterilization cannot be accomplished by filtration. The steroid can be sterilized by exposure to ethylene oxide before suspending in the sterile vehicle. Advantageously, a surfactant or wetting agent is included in the composition to facilitate uniform distribution of the steroid.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, powder packets, granules, wafers, cachets, teaspoonfuls, tablespoonfuls, dropperfuls, ampules, vials, segregated multiples of any of the foregoing, and other forms as herein described.

In addition to the administration of $6\alpha,9\alpha$-difluoro-$11\beta,17\alpha,21$-trihydroxy-$16\alpha$-methyl-$1,4$-pregnadiene-$3,20$-dione as the principal active ingredient of compositions for the treatment of the conditions described herein, the said compound of the novel compositions can be included with other types of compounds to obtain advantageous combinations of properties. Such combinations include $6\alpha,9\alpha$-difluoro-$11\beta,17\alpha,21$-trihydroxy-$16\alpha$-methyl-$1,4$-pregnadiene-$3,20$-dione with antibiotics such as chloramphenical, penicillin, tetracyclines, erythromycin, novobiocin, neomycin, polymyxin and bacitracin; analgesics such as aspirin, sodium salicylate, N-acetyl-p-aminophenol and salicylaminde; agents which lessen pain by means of altering the subject's attitude such as the amphetamines and tranquilizers; local anesthetics such as benzocaine, procaine, and tetracaine; antacids such as calcium carbonate, aluminum hydroxide, basic aluminum carbonate, and bismuth subcarbonate; and the vitamins, especially ascorbic acid and the vitamin B complex.

The dosage of the $6\alpha,9\alpha$-difluoro-$11\beta,17\alpha,21$-trihydroxy-$16\alpha$-methyl-$1,4$-pregnadiene-$3,20$-dione for treatment depends on route of administration, age, weight, and condition of the patient. A dosage schedule of from about 0.1 to about 10 mg., one to four times daily, enhances the effective range for the treatment of most conditions for which the compounds are effective. The $6\alpha,9\alpha$-difluoro-$11\beta,17\alpha,21$-trihydroxy-$16\alpha$-methyl-$1,4$-pregnadiene-$3,20$-diones are compounded with suitable pharmaceutical carriers for convenient and effective administration. In the preferred embodiment of this invention the dosage units contain the steroid in 0.1, 0.25, 0.50, 0.75, 1, and 10 mg. amounts for systemic treatment and in 0.01, 0.05, 0.1. 1 and 5 percent amounts for topical or localized treatment. The dosage of compositions containing the steroid and one or more other active ingredients is to be determined with reference to the usual dosage of each such ingredient.

The following examples are illustrative of the best mode contemplated by the inventors for carrying out their invention and are not to be construed as limiting.

Example 1

10,000 tablets, each containing 10 mg. of $6\alpha,9\alpha$-difluoro-$16\alpha$-methylprednisolone, are prepared from the following types and amounts of ingredients.

| | |
|---|---|
| $6\alpha,9\alpha$-difluoro-$16\alpha$-methylprednisolone | 100 gm. |
| Lactose | 1000 gm. |
| Starch paste (10% w/v starch in water) | 100 cc. |
| Starch | 32.5 gm. |
| Calcium stearate | 6.5 gm. |

The steroid and lactose are mixed together until the steroid is uniformly dispersed and then a granulation prepared by the addition of the starch paste. The granules are dried at 120° F. for 20 hours and the dried granules forced through a No. 16 screen. The granules are lubricated by the addition of the starch and calcium stearate and compressed into tablets, each tablet containing 1 mg. of steroid.

The tablets so prepared are useful in the treatment of rheumatoid arthritis by the oral administration of 1 tablet 3 times a day.

Following the procedure of the preceding example, tablets containing 1 and 0.1 mg. of $6\alpha,9\alpha$-difluoro-$16\alpha$-methylprednisolone are prepared by reducing the amount of $6\alpha,9\alpha$-difluoro-$16\alpha$-methylprednisolone from 100 gm. to 10 gm. and 1 gm. respectively.

Example 2

10,000 tablets, each containing 0.5 mg. of $6\alpha,9\alpha$-difluoro-$16\alpha$-methylprednisolone and 325 mg. (5 grains) of acetysalicylic acid as therapeutic ingredients, are prepared from the following types and amounts of ingredients:

| | |
|---|---|
| $6\alpha,9\alpha$-difluoro-$16\alpha$-methylprednisolone | 5 gm. |
| Acetylsalicylic acid | 3250 gm. |
| Starch 200 gm. | |
| Magnesium stearate | 50 gm. |

The steroid, aspirin, and starch are mixed together until uniformly dispersed. The mixture is then slugged and the slugs broken into granules. The magnesium stearate is added to the granules and the mixture compressed into tablets.

The tablets so prepared are useful in the treatment of rheumatoid arthritis by the oral administration of 1 tablet 3 times a day.

Following the procedure of the preceding example, tablets containing 0.25 mg. of $6\alpha,9\alpha$-difluoro-$16\alpha$-methyl-prednisolone in addition to the 5 grains of aspirin are prepared by reducing the amount of $6\alpha,9\alpha$-difluoro-$16\alpha$-methylprednisolone from 5 gm. to 2.5 gm.

Example 3

1000 two-piece hard gelatin capsules, each containing 0.75 mg. of $6\alpha,9\alpha$-difluoro-$16\alpha$-methylprednisolone, are prepared from the following types and amounts of ingredients:

| | |
|---|---|
| $6\alpha,9\alpha$-difluoro-$16\alpha$-methylprednisolone | 0.75 gm. |
| Corn starch | 150 gm. |
| Magnesium stearate | 25 gm. |
| Hard gelatin capsules | 1000 |

The finely powdered ingredients are mixed thoroughly until uniformly dispersed and then filled into hard gelatin capsules of appropriate size.

The capsules so prepared are useful in the treatment of rheumatic fever at a dose of 1 capsule twice a day.

Following the procedure of the preceding example, capsules containing 0.25 mg. of $6\alpha,9\alpha$-difluoro-$16\alpha$-methylprednisolone are prepared by reducing the amount of steroid to 0.25 gm.

Example 4

1000 gm. of a topical ointment for application to the eye or ear containing 0.1 percent of $6\alpha,9\alpha$-difluoro-$16\alpha$-methylprednisolone and 0.6 percent neomycin sulfate are prepared from the following types and amounts of ingredients:

| | |
|---|---|
| $6\alpha,9\alpha$-difluoro-$16\alpha$-methylprednisolone (Micronized) | 1 gm. |
| Neomycin sulfate (Micronized) | 6 gm. |
| Light liquid petrolatum | 250 gm. |

| | |
|---|---|
| Wool fat | 200 gm. |
| White petrolatum q.s. ad | 1000 gm. |

The wool fat, white petrolatum and 200 gm. of light liquid petrolatum are melted together and held at 110° F. The steroid and neomycin are mixed with the remaining light liquid petrolatum and passed through a colloid mill. After passing through the mill, the mixture is stirred into the melt. With continued stirring, the melt is allowed to cool until congealed.

The foregoing ointment is usefully applied to the eye and ear for local treatment of infection and inflammation.

Following the procedure of the preceding example, an ointment containing 0.01 percent of $6\alpha,9\alpha$-difluoro-$16\alpha$-methylprednisolone is prepared by decreasing the amount of steroid from 1 gm. to 0.1 gm. Similarly the $6\alpha,9\alpha$-difluoro-$16\alpha$-methylprednisolone 21-acetate can be substituted for the free alcohol forms of the example.

Example 5

1,000 gm. of a topical ointment containing 0.1 percent of $6\alpha,9\alpha$-difluoro-$16\alpha$-methylprednisolone is prepared from the following types and amounts of ingredients:

| | |
|---|---|
| $6\alpha,9\alpha$-difluoro-$16\alpha$-methylprednisolone (Micronized) | 1 gm. |
| Light liquid petrolatum | 100 gm. |
| Wool fat | 200 gm. |
| White petrolatum q.s. ad | 1000 gm. |

The wool fat, white petrolatum and one-half of the light liquid petrolatum are melted together and held at a temperature of 160° F. The steroid is added to the remaining light liquid petrolatum and passed through a colloid mill. After passing through the mill, the steroid is stirred into the melt. With continued stirring, the melt is allowed to cool until congealed.

The foregoing ointment is usefully applied to the skin for the treatment of allergic dermatoses and other inflammatory skin diseases.

Following the procedure of the preceding example, an ointment containing 5 percent of $6\alpha,9\alpha$-difluoro-$16\alpha$-methylprednisolone is prepared by increasing the amount of steroid from 1 gm. to 50 gm. Similarly the $6\alpha,9\alpha$-difluoro-$16\alpha$-methylprednisolone 21-acetate can be substituted for the free alcohol form of the example.

Example 6

1,000 cc. of a sterile solution for parenteral administration containing 1 mg./cc. of $6\alpha,9\alpha$-difluoro-$16\alpha$-methylprednisolone 21-succinate sodium is prepared from the following types and amounts of ingredients:

| | |
|---|---|
| $6\alpha,9\alpha$-difluoro-$16\alpha$-methylphednisolone 21-succinate sodium | 1 gm. |
| Sodium biphosphate, anhydrous | 0.8 gm. |
| Sodium phosphate, exsiccated | 0.87 gm. |
| Lactose | 50 gm. |
| Water for injection q.s | 1000 cc. |

The ingredients are dissolved in the water and the solution sterilized by filtration. The sterile solution is aseptically filled into sterile vials, 1 cc./vial, and frozen. The water is removed under high vacuum and the vials containing the lyophilized powder are sealed. Just prior to use, sufficient water for injection to make 1 cc. of solution is added to the vial.

The parenteral solution so prepared is useful in the treatment of rheumatic fever when administered parenterally (intramuscularly or intravenously) at a dose of 1 cc.

Following the procedure of the preceding example, a parenteral solution containing 0.1 or 10 mg. of $6\alpha,9\alpha$-difluoro-$16\alpha$-methylprednisolone 21-succinate sodium is prepared by substituting the amount of steroid from 1 gm. to 0.1 gm. and 10 gm. respectively.

Example 7

1,000 cc. of a solution for ophthalmic treatment containing 0.075 percent $6\alpha,9\alpha$-difluoro-$16\alpha$-methylprednisolone 21-succinate sodium and 6,000 units/cc. of polymyxin B sulfate are prepared from the following types and amounts of ingredients:

| | | |
|---|---|---|
| $6\alpha,9\alpha$-difluoro-$16\alpha$-methylprednisolone 21-succinate sodium | | 0.75 gm. |
| Polymyxin B sulfate (10,000 units/mg.) | | 0.6 gm. |
| Sodium citrate | | 4.5 gm. |
| Polyethylene glycol 4000 | | 120 gm. |
| Polyvinyl pyrrolidone | | 1 gm. |
| Sodium hydroxide | q.s. | pH 7 to 7.4 |
| Water for injection | q.s ad | 1000 cc. |

The ingredients are dissolved in the water and the pH adjusted to from pH 7 to pH 7.4 by the addition of sodium hydroxide. The solution is sterilized by filtration and aseptically filled into sterile 5 cc. dropper bottles.

The composition so prepared is useful for the treatment of infection and inflammation in the eye by the administration to the eye of 1 to 5 drops 3 times a day.

What is claimed is:

1. A therapeutic composition which comprises: as the principal active ingredient, a compound selected from the group consisting of (1) $6\alpha,9\alpha$-difluoro-$11\beta,17\alpha,21$-trihydroxy-$16\alpha$-methyl-1,4-pregnadiene-3,20-dione, (2) $6\alpha,9\alpha$-difluoro-$11\beta,17\alpha,17\alpha,21$-trihydroxy-$16\alpha$-methyl-1,4-pregnadiene-3,20-dione 21-acylates in which the acyl radical is that of an organic carboxylic acid containing one through 16 carbon atoms, and (3) salts of the 21-acylates of $6\alpha, ,9\alpha$-difluoro-$11\beta,17\alpha,21$-trihydroxy-$16\alpha$-methyl-1,4-pregnadiene-3,20-dione, in combination with a pharmaceutical carrier.

2. A therapeutic composition comprising, in unit dosage form, at least about 0.1 mg. of a member selected from the group consisting of (1) $6\alpha,9\alpha$-difluoro-$11\beta,17\alpha,21$-trihydroxy-$16\alpha$-methyl-1,4-pregnadiene-3,20-dione, (2) $6\alpha,9\alpha$-difluoro-$11\beta,17\alpha,21$-trihydroxy-$16\alpha$-methyl-1,4-pregnadiene-3,20-dione 21-acylates in which the acyl radical is that of an organic carboxylic acid containing one through 16 carbon atoms, and (3) salts of the 21-acylates of $6\alpha,9\alpha$-difluoro-$11\beta,17\alpha,21$-trihydroxy-$16\alpha$-methyl-1,4-pregnadiene-3,20-dione, in combination with a pharmaceutical carrier.

3. A therapeutic composition comprising, in unit dosage form, from about 0.1 to about 10 mg. of a member selected from the group consisting of (1) $6\alpha,9\alpha$-difluoro-$11\beta,17\alpha,21$-trihydroxy-$16\alpha$-methyl-1,4-pregnadiene-3,20-dione, (2) $6\alpha,9\alpha$-dilfuoro-$11\beta,17\alpha,21$-trihydroxy-$16\alpha$-methyl-1,4-pregnadiene-3,20-dione 21-acylates in which the acyl radical is that of an organic carboxylic acid containing one through 16 carbon atoms, and (3) salts of the 21-acylates of $6\alpha,9\alpha$-difluoro-$11\beta,16\alpha,21$-trihydroxy-$16\alpha$-methyl-1,4- pregnadiene-3,20-dione, as an essential active ingredient in combination with a pharmaceutical carrier.

4. A therapeutic composition comprising from about 0.01 percent to about 5 percent of a member selected from the group consisting of (1) 6α,9α-difluoro-11β,17α,21-trihydroxy-16α-methyl-1,4-pregnadiene-3,20-dione, (2) 6α,9α-difluoro-11β,17α,21-trihydroxy-16α-methyl-1,4-pregnadiene-3,20-dione 21-acylates in which the acyl radical is that of an organic carboxylic acid containing 1 through 16 carbon atoms, and (3) salts of the 21-acylates of 6α,9α-difluoro-11β,17α,21-methyl-1,4-pregnadiene-3,20-dione, as an essential active ingredient in combination with a fluid pharmaceutical vehicle.

5. A therapeutic composition in tablet form comprising from about 0.1 to about 10 mg. of a member selected from the group consisting of (1) 6α,9α-difluoro-11β,17α,21-trihydroxy-16α-methyl-1,4-pregnadiene-3,20-dione, (2) 6α,9α-difluoro-11β,17α,21-trihydroxy-16α-methyl-1,4-pregnadiene-3,20-dione 21-acylates in which the acyl radical is that of an organic carboxylic acid containing one through 16 carbon atoms, and (3) salts of the 21-acylates of 6α,9α-difluoro-11β,17α,21-trihydroxy-16α-methyl-1,4-pregnadiene-3,20-dione, as an essential active ingredient in combination with a pharmaceutical diluent.

6. A sterile injectable composition for parenteral administration comprising at least about 0.01 percent of a member selected from the group consisting of (1) 6α,9αdi-fluoro-11β,17α,21-trihydroxy-16α-methyl-1,4-pregnadiene-3,20-dione, (2) 6α,9α-difluoro-11β,17α,21-trihydroxy-16α-methyl-1,4-pregnadiene-3,20-dione 21-acylates in which the acyl radical is that of an organic carboxylic acid containing 1 through 16 carbon atoms, and (3) salts of the 21-acylates of 6α,9α-difluoro-11β,17α,21-trihydroxy-16α-methyl-1,4-pregnadiene-3,20-dione as an essential active ingredient in combination with a sterile vehicle.

7. A process for treating human and animal inflammatory conditions which comprises: administering a therapeutic composition containing a therapeutic amount of a compound selected from the group consisting of (1) 6α,9α-difluoro-11β,17α,21-trihydroxy-16α-methyl-1,4-pregnadiene-3,20-dione 21-acylates in which the acyl radical is that of an organic carboxylic acid containing one through 16 carbon atoms, and (3) salts of the 21-acylates of 6α,9α-difluoro-11β,17α,21-trihydroxy-16α-methyl-1,4-pregnadiene-3,20-dione as an essential active ingredient in combination with a sterile vehicle.

8. A process for treating human and animal inflammatory conditions which comprises: administering a therapeutic composition containing from about 0.1 to about 10 mg. per dosage unit of a compound selected from the group consisting of (1) 6α,9α-difluoro-11β,17α,21-trihydroxy-16α-methyl-1,4-pregnadiene-3,20-dione, (2) 6α,9α-difluoro-11β,17α,21-trihydroxy-16α-methyl-1,4pregnadiene-21-acylates in which the acyl radical is that of an organic carboxylic acid containing one through 16 carbon atoms, and (3) salts of the 21-acylates of 6α,9αdifluoro-11β,17α,21-trihydroxy-16α-methyl-1,4-pregnadiene-3,20-dione in combination with a pharmaceutical carrier.

* * * * *